United States Patent [19]

Gerkey et al.

[11] 4,200,424
[45] Apr. 29, 1980

[54] REMOTELY CONTROLLED TOOL POSITIONING TABLE

[75] Inventors: Kenneth S. Gerkey, Mt. Lebanon; Edward H. Smith, New Alexandria, both of Pa.

[73] Assignee: Westinghouse Electric Corp., Pittsburgh, Pa.

[21] Appl. No.: 896,530

[22] Filed: Apr. 14, 1978

[51] Int. Cl.² ............................................. B25J 9/00
[52] U.S. Cl. ...................................... 414/744; 29/726; 104/47; 414/746; 414/750
[58] Field of Search ............. 214/1 BB, 1 BC, 1 CM, 214/151; 104/35, 46, 47; 29/726; 165/76; 308/36.1, 157; 414/744, 746, 750

[56] References Cited

U.S. PATENT DOCUMENTS

| | | | |
|---|---|---|---|
| 958,162 | 5/1910 | Noble | 104/46 X |
| 2,013,933 | 9/1935 | Wagner | 29/726 |
| 3,144,280 | 8/1964 | Sorenson | 308/36.1 |
| 3,545,628 | 12/1970 | Dechantsreiter | 104/47 X |
| 3,881,607 | 5/1975 | Lewis | 214/1 BC |
| 3,913,752 | 10/1975 | Ward et al. | 214/1 BB |
| 3,934,731 | 1/1976 | Müller | 214/1 BB |
| 4,087,084 | 5/1978 | Meyers | 214/1 BB X |

*Primary Examiner*—L. J. Paperner
*Attorney, Agent, or Firm*—F. A. Winans

[57] ABSTRACT

An accurately indexed rotatable tool positioning table for use with inspection and repair apparatus remotely disposed within the channel head of a steam generator is shown. The table is automatically rotated by a motor to predetermined positions and an angular position resolving mechanism in engagement therewith provides an output signal responsive to the angular movement for accurate position determination and control. An indexing pin is received in an indexing bushing in the plate to insure accurate, repeatable positioning of the plate, and switch means are associated therewith and operatively connected to the tool energizing circuit to prevent operation of any tool until the indexing pin is properly seated in the bushing and to prevent the positioning motor actuation until the pin is fully withdrawn from the bushing.

2 Claims, 3 Drawing Figures

REMOTELY CONTROLLED TOOL POSITIONING TABLE

BACKGROUND OF THE INVENTION

1. Field of the Invention

This invention relates to apparatus for remotely repairing and replacing the tubes and tubesheet in a nuclear steam generator, and more particularly to a rotatable tool positioning device forming a part of the apparatus for remotely accurately positioning any of the tools.

2. Description of the Prior Art

Copending patent application Ser. No. 888,701 filed Mar. 21, 1978 of common assignee, discloses a remotely mounted tool support and positioning apparatus for inspecting and repairing the tube and tubesheet of a nuclear steam generator. Generally, this apparatus comprises a horizontally extending tool holder arm cantilevered from a platform which is horizontally movable along a boom and also able to be elevated therefrom. The boom is supported in a manner to permit angular movement in the horizontal plane parallel to the tubesheet. Thus, with the platform being movable radially and vertically and with the boom being movable angularly, a tool disposed in the free or distal end of the tool holder arm can be positioned subadjacent any particular point of the tubesheet and then elevated into proper relationship for accomplishing whatever operation on the tubes or tubesheet is desired. However, because of the internal configuration of the channel head of the generator in which the boom is supported and also because of the configuration of the support of the boom therein, the length of the boom is limited and the travel of the platform therealong is also limited. Therefore, there are certain tubes, i.e., those closest to the divider plate separating the inlet and outlet side of the tubesheet and those tubes closest to the outer wall of the generator, beneath which the platform cannot be disposed. The tool holder arm provides the necessary extension to permit this proper disposition of the tool beneath such tubes; however, the arm must be extending generally radially outwardly to be disposed beneath the outer tubes and generally radially inwardly to be disposed beneath the tubes along the divider plate. Thus, the tool holder arm is manually releasably attached through well known quick release mechanisms to the platform so that when all the necessary operations are accomplished on the tubes or those portions of the tubesheet which are accessible when it extends outwardly, the arm is manually repositioned to extend inwardly for access to the remaining areas and tubes. Thus, under such conditions, minimal exposure to the inside of the generator is required to manually reset the tool arm.

The above operation is generally descriptive of the procedure when the apparatus and tools are being used to remove the tubes and repair and refurbish the tubesheet. However, for retubing operations within the steam generator, the tubes will be installed one column at a time. This means that for each column that is inserted the tool holder arm will have to be changed from one position (i.e., extending outwardly for access to the outermost tubes of that column) to the other position (i.e., extending inwardly for access to the innermost tubes of the column). As there are on the order of 114 columns of tubes, this would require the tool arm to be repositioned 114 times for each individual operation in the retubing procedure. Further, as there are numerous separate operations each requiring a separate tool, such as installing the tubes to the tubesheet, removing the tube guides, positioning the tube ends flush with the tubesheet, and welding the tubes to the tubesheet, all of which may have to be done as each column or several columns is installed, it is evident that manually repositioning the tool holder arm would require extensive exposure to the generator interior.

SUMMARY OF THE PRESENT INVENTION

The present invention provides a motor-driven rotatable table from which the tool holder arm is cantilevered. The rotatable table replaces the non-rotatable platform of the previously identified apparatus to permit remote controlled rotation thereof to properly dispose the tool holder arm in either an inwardly extending or outwardly extending position, and includes means for determining the angular position of the table. Also, a remotely actuatable indexing pin for securing the table in an exact angular position is provided with an upper switch responsive to the proper seating of the indexing pin for permitting energization of the tool and a lower switch responsive to proper withdrawal of the indexing pin for permitting actuation of the rotatable table.

DESCRIPTION OF THE PREFERRED EMBODIMENT

Figure 1:
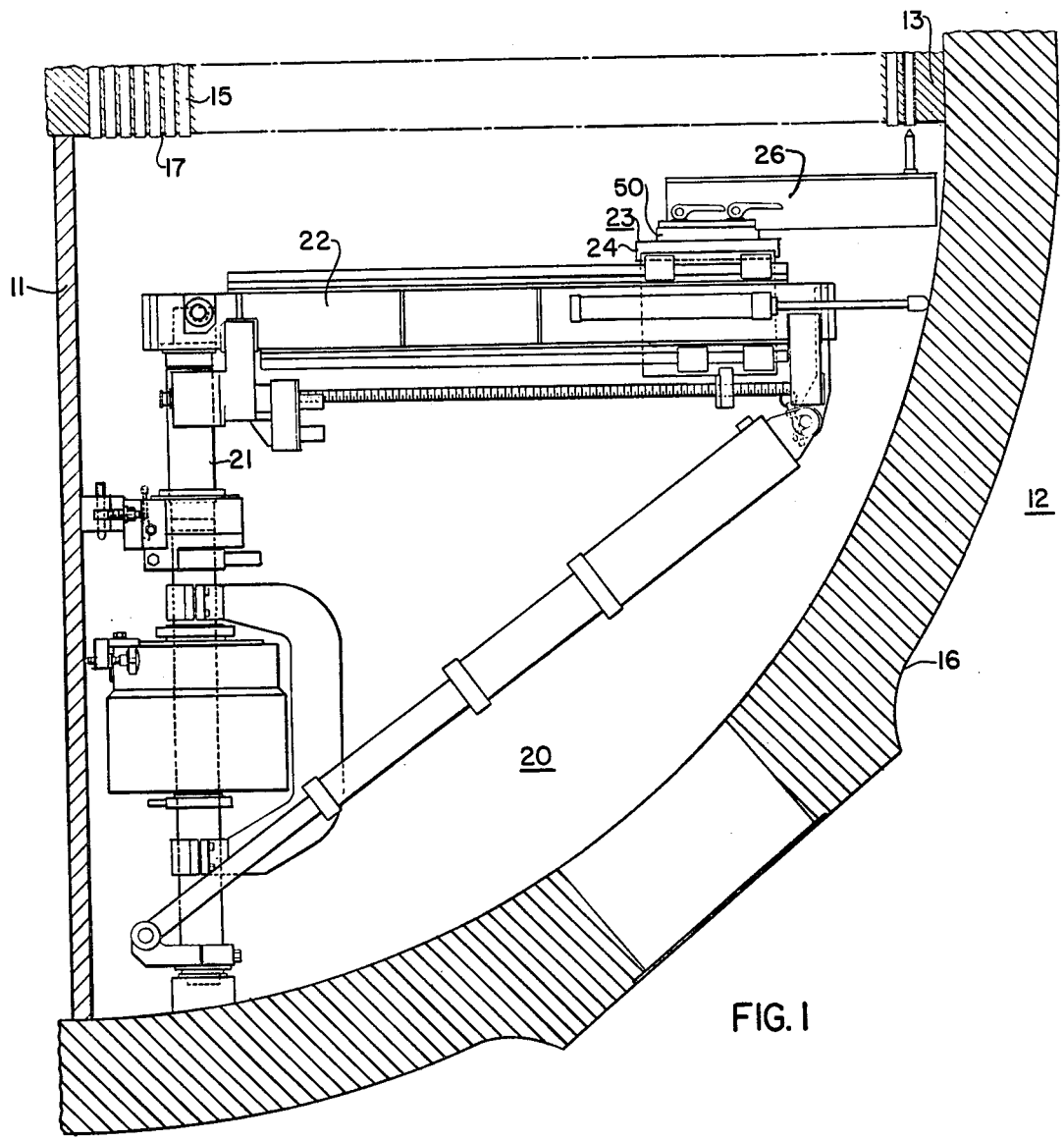
FIG. 1 is a partial sectional view of a steam generator head with remotely operated apparatus disposed therein for repairing the tubes and tubesheet.

The remotely controlled rotatable table of the present invention, as explained in the Background of the Invention, replaces what was heretofore a non-rotatable table or platform of certain apparatus specifically directed to repairing and refurbishing the heat exchanger tubes and tubesheet of a nuclear steam generator. Such apparatus is adequately described in the above-identified copending commonly owned patent application Ser. No. 880,701. However, to more clearly illustrate the environment of the remotely controlled rotatable table of the present invention, such repair apparatus is generally described with reference to FIG. 1 which shows a portion of the channel head 10 of a steam generator 12 having a tubesheet 13 with a plurality of holes 15 therethrough containing the ends of heat exchanger tubes 17. The head is partitioned by a dividing plate 11 into an inlet portion and an outlet portion (only one of such portions being shown) and it is understood that the tubes are generally "U-shaped" with one end opening into the inlet portion and the other into the outlet portion.

Apparatus 20 for repairing the tubes 17 is disposed below the tubesheet 13 with one such apparatus in each portion. The apparatus 20 generally comprises a vertical rotatable column 21 having a horizontally extending boom 22, which, in the operative position, is maintained horizontal, subadjacent the tubesheet 13. A carriage 23 is movably mounted on the boom for horizontal travel therealong. The carriage includes a platform 24 mounted for guided vertical movement from stationary plate of the carriage all as shown in the above-described copending application. However, because of the configuration of the channel head and the limited permitted travel of the carriage, not all of the tubes 17 are accessible from the carriage 23. Thus, a tool holding arm or extension 26 is attached thereto to permit disposition of a tool immediately below the tubes. It is seen that with the tool holder arm 26 mounted to extend outwardly (as seen in FIG. 1) the tubes closest to the divider plate are still not accessible. Heretofore it was therefore necessary to manually reposition the tool holder arm 26 to extend inwardly for tool access to such tubes. In accordance with the present invention, the movable platform 24 supports a remotely operable rotatable plate 30 on which the tool arm 26 is mounted for automatically positioning the tool arm to extend in either an inwardly or outwardly direction or any intermediate position.

Figure 2:
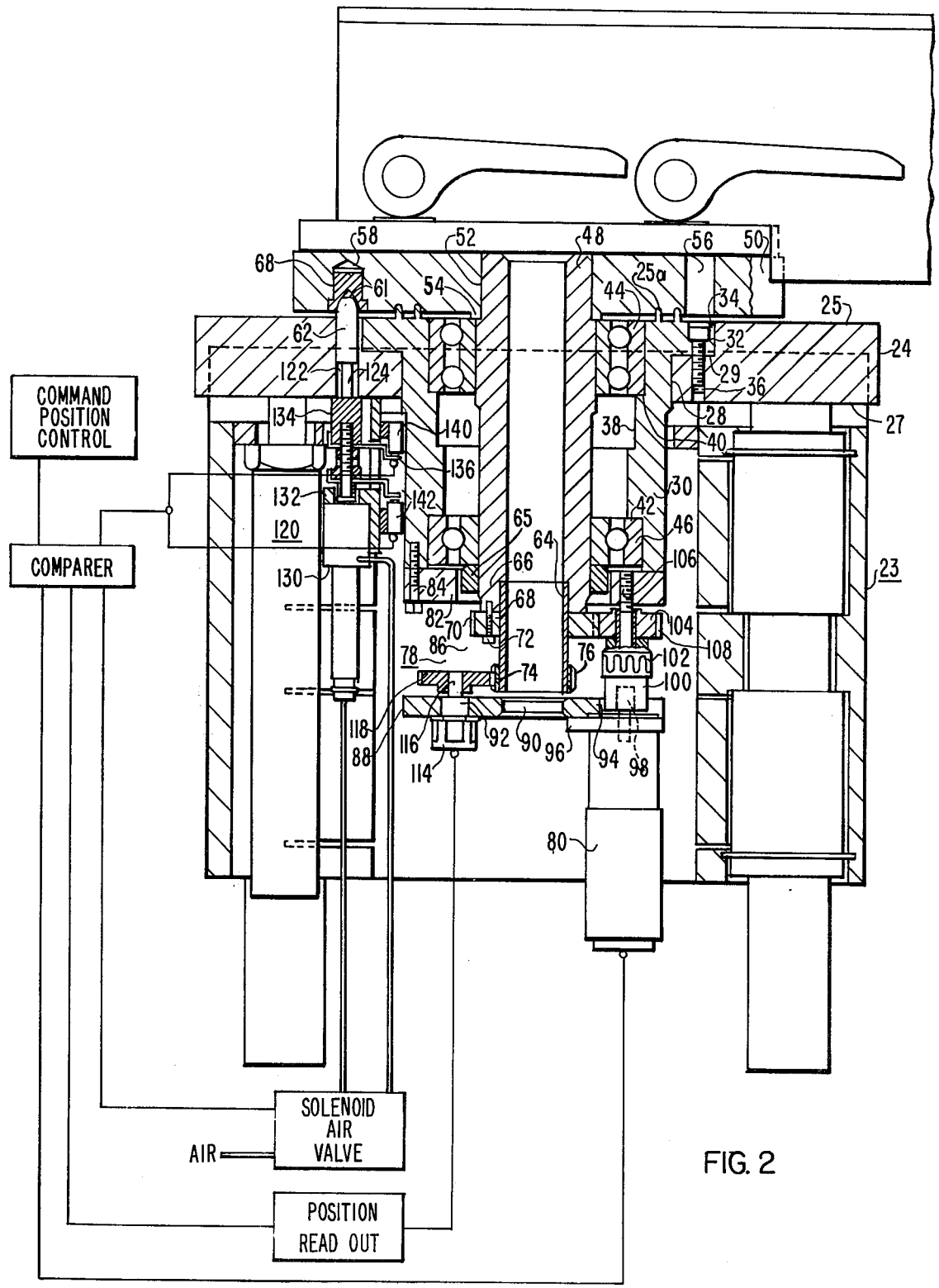
FIG. 2 is a partial elevational sectional view of a movable, tool positioning carriage of the apparatus of FIG. 1 according to the present invention.
Figure 3:
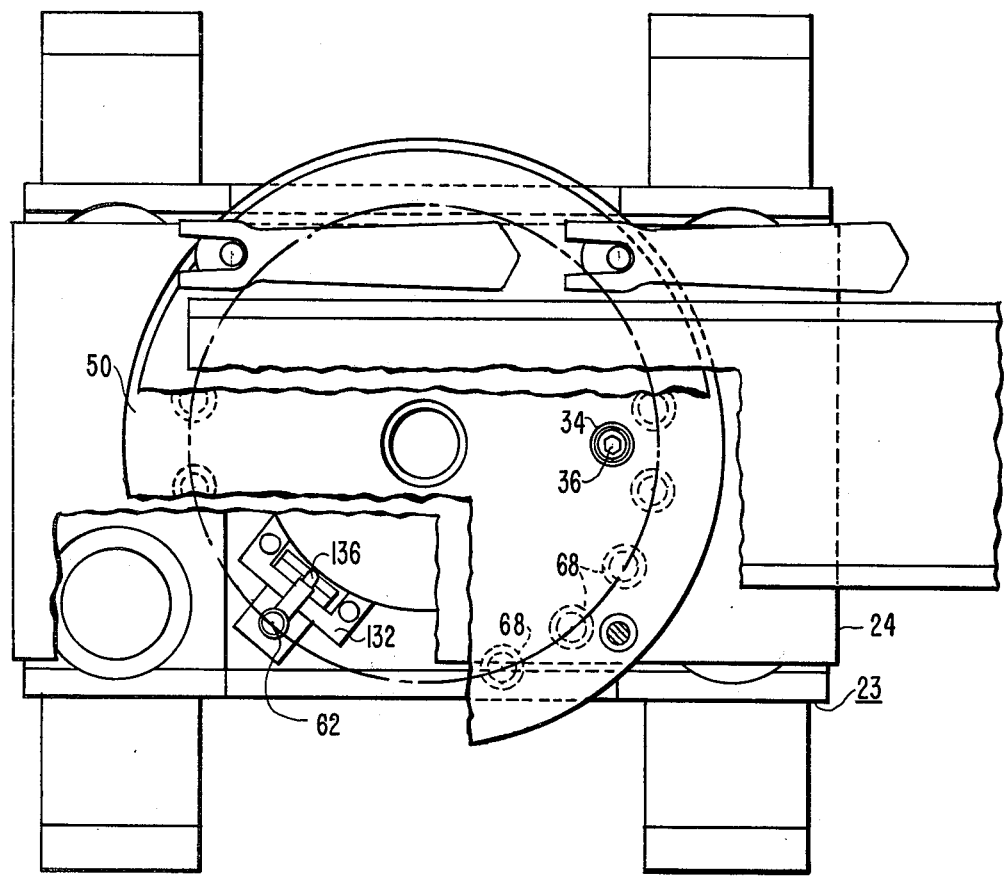
FIG. 3 is a top plan view of FIG. 2.

Thus, reference is made to FIGS. 2 and 3 which show the platform 24 mounted for guided vertical movement on the carriage 23. The platform is generally rectangular and defines an upper planar horizontal face 25 and a lower face 27. The platform has a central opening 28 with an upwardly open recessed peripheral shoulder 29. A hollow, generally cylindrical, collar member 30 is disposed within the opening 28 and defines an upper flange 32 for seating in the recessed shoulder 29 with the upper surface 34 thereof generally flush with the upper surface 25 of the platform and defining annular raised sealing rings 25a. The platform 24 and cylindrical member 30 are secured together as through bolts 36 passing through the flange 32 and into the shoulder 29.

The internal diameter 38 of the cylinder 30 is enlarged at both the upper and lower ends thereof to seat within the notches 40, 42 thus provided, an upper bearing 44 and a lower bearing 46. A hollow shaft 48 extends through the collar member 30 in intimate contact with the inner raceways of the upper and lower bearings for rotation with respect to the platform 24. The upper end of the shaft 48 extends above the platform 24 and a circular, substantially planar plate member 50, having a central opening 52 sized to receive the shaft 48 therein is securely attached to the shaft, as by welding, with the upper surface of the tube substantially flush. The plate member 50 is maintained elevated above the platform 24 by a lip 54 extending downwardly from the underside of the plate member and peripherally about the central opening 52 to abut the upper surface of the inner raceway of bearing 44 for seating thereon and the underside also defines annular cavities 55 concentric with the annular rings 25a for receiving the rings therein to provide a labyrinth seal for the bearings.

The plate member 50 defines means, not shown but of well known construction, such as Expando Grip pins, for releasably attaching tool holder arm thereto and also defines at least one aperture 56 therethrough at a radius common to the radius of the bolts 36 securing the cylinder 30 to the platform 24 for access to these bolts through the plate member 50. Also, the undersurface of the plate member has a plurality of generally equiangularly spaced downwardly open cavities 58 therein at a common radius. (To index the arm in either the extreme outwardly extending position and the extreme inwardly extending position, two such diametrically opposed cavities would be required; however, depending upon the desired indexed movement of the table, any number above these two cavities can be provided.) A bushing 60 having a conical internal wall 61 tapering outwardly downwardly is secured in each cavity 58 and provides a seating engagement with a conical-nosed indexing pin 62 projecting upwardly thereinto for acurately angularly positioning and securing the plate member 50 in a manner to be described.

A hollow stub shaft 64 is disposed within the lower end 66 of the shaft 48 to project downwardly therefrom. An upper ring 68, having externally geared teeth 70 is secured to the stub shaft 64 as by welding and abuts the end face of the shaft 48. The ring 68 is secured to the shaft 48 as by bolts 72 to maintain the stub shaft 64 on the shaft 48. The stub shaft 64 also has a lower ring 74 also having external gear teeth 76 for a purpose to be described.

A motor-mounting subassembly 78 is attached to the lower end of the cylinder 30 for mounting a motor 80 (either air or electric-operated) in driving engagement with the plate member 50 through shaft assembly 64, 48. The mounting assembly 78 includes an upper annulus 82 secured, as by bolts 84, to the lower end of the cylinder 30 and having a central opening sufficiently large to freely pass over the outer diameter of the gear rings 70 and 76 from the stub shaft 64 and also encircles a bearing retaining collar 65 threadably secured to the lower end of shaft 48 and abutting the lower bearing 46. A pair of diametrically opposed vertically extending legs 86 (only one being shown) form an integral extension of the annulus and extend downwardly therefrom. A lower horizontal cross member 88 bridges the legs 86 at their lower end. The cross member 88 has a central opening 90 concentric with the hollow shafts 48, 64 and a pair of openings 92, 94 on opposite sides of the central opening 90. A reversible motor 80 is secured to the cross member 88 through a motor mounting collar 96 bolted to the bottom face of the cross member and the drive shaft 98 of the motor extends upwardly through one opening 92.

A coupling device, comprising a pair of opposed axially aligned members having axially extending, interengaging projections and commonly referred to as an "FA" coupling, available from the Boston Gear Division of North American Rockwell, is mounted with one element 100 attached, as by a setscrew to the drive shaft 98 and the opposing element 102 secured to the lower face of a gear member 104. The gear member 104 is rotatably retained on a headed shaft 106 secured to the undersurface of the annulus 82. The external gear teeth 108 of the gear are in meshing engagement with the teeth 70 of the upper gear ring 68, to provide a driving engagement from the motor 80 to the lower shaft 64 and ultimately to the plate 50.

A precision potentiometer 114, to provide signaling means relating to the angular position of the plate member 50 is mounted in a depending position from the cross member 88 with the shaft 116 extending upwardly through the other aperture 94 therein. A gear 118 is secured to the shaft 116 in meshing engagement with the lower gear ring 74 on the stub shaft 64. The gear 118 is a spring-loaded split gear to prevent any play between the gear ring 74 and the gear 118 so the rotation of the shaft and plate member 50 can be accurately measured or determined by the precision potentiometer 114. (It is to be understood that the potentiometer 114 is electrically connected to the remote controls or automatic controlling device for position readout which is automatically compared to the desired position, and the motor 80 is driven in response thereto for positioning the table at the desired angle. The indexing pin 62 is then driven into the bushing 58. Such controls, although generally illustrated, form no part of this invention.)

An indexing pin assembly 120 is mounted to the undersurface 27 of the platform 24 and includes an upwardly projecting conical-nosed pin 62 projecting through an aperture 122 in the platform 24 for receipt in the tapered indexing bushings 60. The pin 62 is mounted on the upper end of a retractable plunger 124 which is actuated from a retracted position to the extended position shown by an air cylinder 130 mounted on a support 132 beneath the platform. The plunger 124 includes an intermediate member 134 adjustably secured thereon for mounting a tab member 136 which projects outwardly from the plunger 124 to contact either one or the other of a pair of stationarily supported microswitches 140, 142. The upper switch is contacted when the pin is in the proper seating engagement within the bushing and is electrically connected in the tool energizing circuit such that the tools cannot be energized unless the retractable plunger is in such proper position. The lower microswitch 142 is contacted by the tab member 136 only when the plunger is in a fully retracted position whereupon the table is free to be rotated. This switch is electrically connected in the table energizing circuit which will not be actuated until the switch is closed by the tab.

In that the gear drive for rotating the plate member 50 has necessary tolerances in its design and assembly, the angular position of the plate 50, although indicated by the precision potentiometer to be in proper position, can be in slight misalignment. And, because the tool is mounted on the end of the tool arm extending from the plate 50, the amount the plate is in misalignment from a precise position can result in an exaggeration of the misalignment of the tool to an unacceptable amount. Thus, the indexing mechanism just described permits the table member 50 to be positioned as accurately as possible from the drive motor 80 which, in all instances, will provide substantial alignment of the conical-nosed indexing pin 62 with an indexing bushing 60. However, for repeatable final positively accurate alignment of the tool, the air-driven plunger 124 forces the pin 62 into the bushing 60 and because of the tapered relationship, the plate will move in either direction to a position wherein the pin is properly seated within the bushing. The drive system backlash permits limited movement of the plate without resulting in any movement in the armature of the motor 80. The shaft 116 in the potentiometer is relatively free to turn and does not require any particular coupling to accommodate such backlash movement of the table.

Thus, forcing the indexing pin 62 into proper seating engagement with the bushing 60 accurately indexes the table member 50, and such is indicated by the projection 136 causing the microswitch 140 to permit energization of the tools.

It is to be noted that the hollow shaft 64, 48 permit the tool power lines or umbilical cords such as air, hydraulic, electrical, etc. to be passed therethrough from below the table 50 to above the table and thence along or parallel to the tool holding arm and generally free of any interference with any structure.

We claim:

1. In combination with a remotely operated and monitored tool support and positioning apparatus for retubing a steam generator, a rotatable table assembly for supporting a tool holding arm and accurately positioning said arm and attached tool within said generator, said assembly comprising:

a non-rotatable platform supported on said apparatus defining an upper and a lower surface and having a vertically oriented opening therethrough and a downwardly extending cylindrical wall means concentric with said opening;

a rotatable table member defining an upper and lower surface and supported with said lower surface spaced above the upper surface of said platform and having a vertically oriented opening therethrough and a downwardly extending hollow shaft means, concentric with said table opening, positioned within said cylindrical wall means in a spaced relation, said lower surface of said table member defining a plurality of downwardly open cavities having a downwardly diverging wall and angularly spaced at a common radius from the axis of rotation of said table member;

bearing means for rotatably supporting said table member on said platform;

drive means including a reversible motor drivingly engaging said shaft for rotating said table member in either direction of rotation and having a slight permissible degree of backlash and means drivingly engaged by said shaft and responsive to the rotation thereof for generating a signal relative to the angular position of said table member from a preset position;

indexing means including a movable pin having an upwardly converging wall complementary to said cavity wall and disposed within a vertical aperture in said platform at a radius common to said cavities and means for moving said pin between a retracted position permitting free rotation of said table member and an extended position for indexed seating within one of said cavities to positively position said table in an exact angular position;

a condition indicating means including a switch and means associated with said indexing means for positioning said switch in a condition to indicate that said movable pin is in either said retracted position or said extended position; and, mounting means common to said motor and said signal generating means for mounting said named components on generally opposite sides and adjacent the lower end of said shaft and wherein said mounting means defines a configuration which permits service lines to pass from beneath the assembly to above said table member through said hollow shaft.

2. Structure according to claim 1 wherein said motor mounting means is secured to the lower end of said cylindrical wall means.

* * * * *